United States Patent [19]
Suh

[11] Patent Number: 5,561,713
[45] Date of Patent: Oct. 1, 1996

[54] APPARATUS FOR SCRAMBLING AND DESCRAMBLING A VIDEO SIGNAL

[75] Inventor: Jin-Woo Suh, Seoul, Rep. of Korea

[73] Assignee: Daewoo Electronics Co., Ltd., Seoul, Rep. of Korea

[21] Appl. No.: 276,236

[22] Filed: Jul. 18, 1994

[30] Foreign Application Priority Data

Jul. 16, 1993 [KR] Rep. of Korea ............... 93-13510

[51] Int. Cl.⁶ ........................................ H04N 7/167
[52] U.S. Cl. .................................... 380/10; 380/20
[58] Field of Search ........................... 380/7, 10, 20

[56] References Cited

U.S. PATENT DOCUMENTS 4,605,961  8/1986  Frederiksen .
4,636,852  1/1987  Farmer .
4,646,147  2/1987  Krüger ........................... 380/14
5,177,786  1/1993  Kang ............................. 380/10
5,418,853  5/1995  Kanota et al. ............... 380/20 X

FOREIGN PATENT DOCUMENTS 0356200  8/1989  European Pat. Off. .

Primary Examiner—Gilberto Barrón, Jr.
Attorney, Agent, or Firm—Anderson Kill Olick & Oshinsky, P.C.

[57] ABSTRACT

A scrambler for scrambling a composite video signal comprises a scrambling data generator for generating a number of scrambling data. Each of the scrambling data is added to each of a corresponding number of digitized video data samples converted by an analog-to-digital converter, to thereby generate a scrambled video signal.

3 Claims, 5 Drawing Sheets

5,561,713

APPARATUS FOR SCRAMBLING AND DESCRAMBLING A VIDEO SIGNAL

FIELD OF THE INVENTION

The present invention relates to an apparatus for scrambling and descrambling a video signal; and, more particularly, to a scrambler for shuffling random data into digitized video signal samples and a descrambler for removing the random data from the digitized video signal samples.

DESCRIPTION OF THE PRIOR ART

In subscription television broadcasting systems, there has been a constant need for a reliable method/device for scrambling or encrypting television signals at a transmitter and for descrambling or decoding the scrambled television signals at a receiver so that the television signals are protected against an unauthorized access. The above method/device for scrambling and descrambling the television signals is gaining its usages with increased frequencies in commercial applications such as television or satellite communications. For example, CATV signals are often scrambled so that a picture being transmitted can only be viewed by the users having an appropriate or authorized decoder.

One of the prior art methods employed to scramble and descramble a video signal is disclosed in Europe Patent Application No. 0 356 200, in which the video signal in analog form is digitized into separate data packets for separate video lines. The data packets are sequentially inputted to a memory and the sequence read out from the memory is randomly intermixed.

U.S. Pat. No. 5,192,609 issued to Heun H. Mun offers a circuit for scrambling a digital TV signal. The scrambling circuit comprises a memory and a pseudo-random address generator for generating a pseudo-random address and a sequential address. The digital TV signal is written on the memory in accordance with the pseudo-random address and read out from the memory in accordance with the sequential address in order to form a scrambled TV signal, which is incorporated herein by reference.

While the above and other prior art scrambling devices may be capable of performing their assigned task, they necessarily require a memory for use to change the sequence of the digital video signal. Therefore, needs have continued to exist for an improved video signal scrambling device which is more advantageous and desirable in terms of memory requirements and manufacturing costs.

SUMMARY OF THE INVENTION

It is, therefore, an object of the invention to provide an apparatus for scrambling and descrambling a video signal without requiring a memory device to store digital video signals to be scrambled.

It is another object of the invention to provide an apparatus for scrambling and descrambling a video signal by shuffling random data into the video signal and removing the random data from the video signal.

In accordance with the present invention, there is provided a scrambler for scrambling a composite video signal, which comprises a detector for detecting horizontal and vertical blanking pulses from the composite video signal, an analog-to-digital converter for converting the composite video signal into a number of digital video samples, a scrambling data generator, in response to the horizontal blanking pulses, for generating a corresponding number of scrambling data, and an adder for adding each of the scrambling data into each of the digital video samples to produce a scrambled video signal.

BRIEF DESCRIPTION OF THE DRAWINGS

The above and other objects and features of the present invention will become apparent from the following description of preferred embodiments taken in conjunction with the accompanying drawings, in which.

DETAIL DESCRIPTION OF THE PREFERRED EMBODIMENTS

Figure 1:
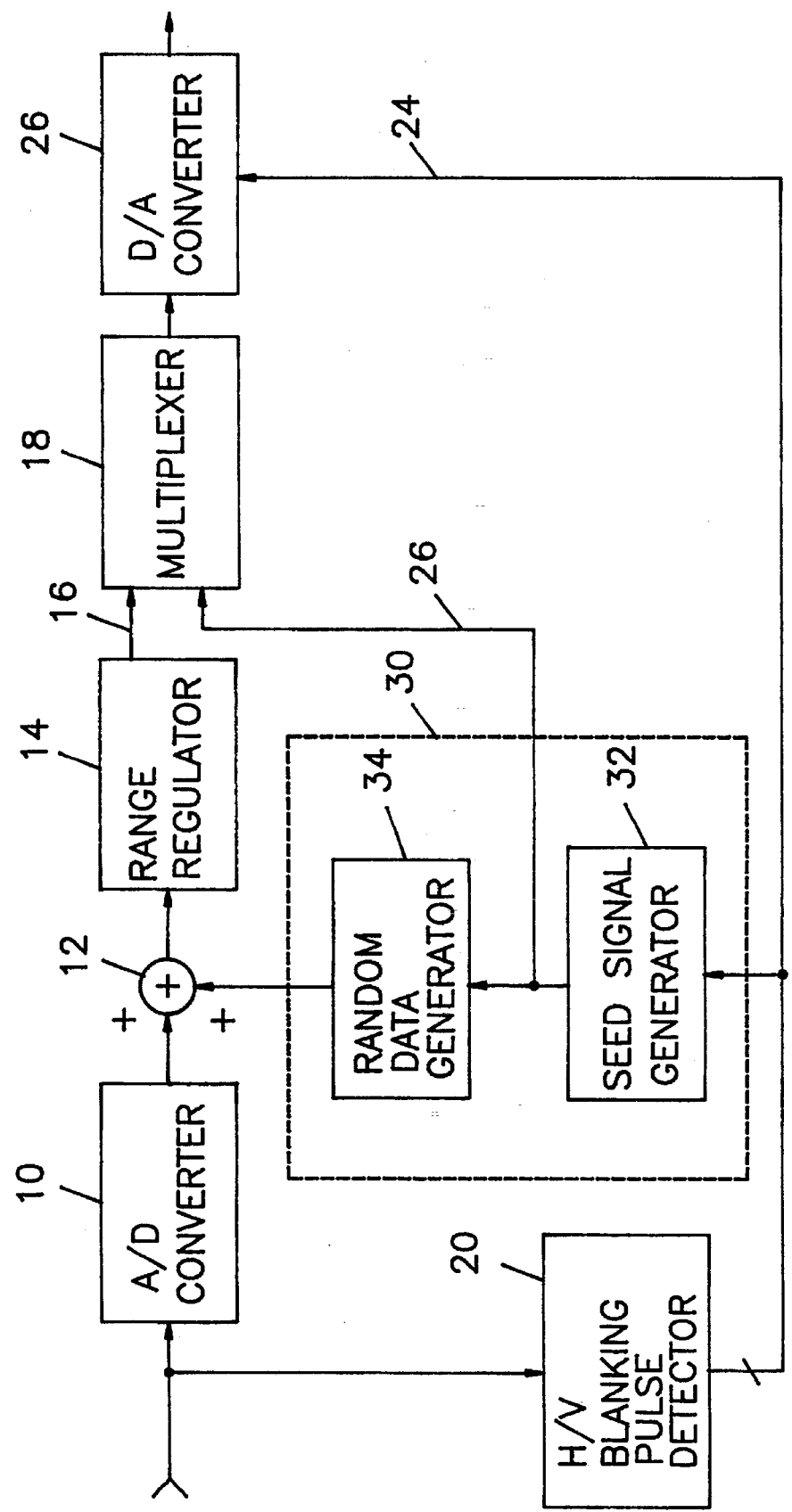
FIG. 1 shows a block diagram of the scrambler in accordance with the present invention.

Referring to FIG. 1, there is shown a block diagram of a scrambler incorporated in a transmitter, which processes a composite video signal to produce a scrambled video signal at its output end. As is conventional, there are horizontal and vertical blanking pulses in the composite video signal. The horizontal blanking pulses are included to blank out the retrace from right to left in each horizontal scanning line. The vertical blanking pulses blank out the scanning lines produced when an electron beam retraces vertically from bottom to top in each field. Each of the horizontal and the vertical blanking pulses contains a horizontal and a vertical synchronizing pulse. The horizontal synchronizing pulse at the end of each line determines the start of a horizontal retrace and the vertical synchronizing pulse at the end of each field determines the start of a vertical retrace.

The composite video signal is distributed to an analog to digital ("A/D") converter 10 and a horizontal/vertical ("H/V") blanking pulse detector 20. The A/D converter 10 digitally samples and converts the composite video signal into a number of N-bit video data samples. Each of the N-bit video data samples, if said N is equal to 8, can have one of 256(=$2^8$) distinct quantities or values ranging from a decimal number "0" to "255" in a digital system. Each of the video data samples is applied to one input of an adder 12.

Figure 2:
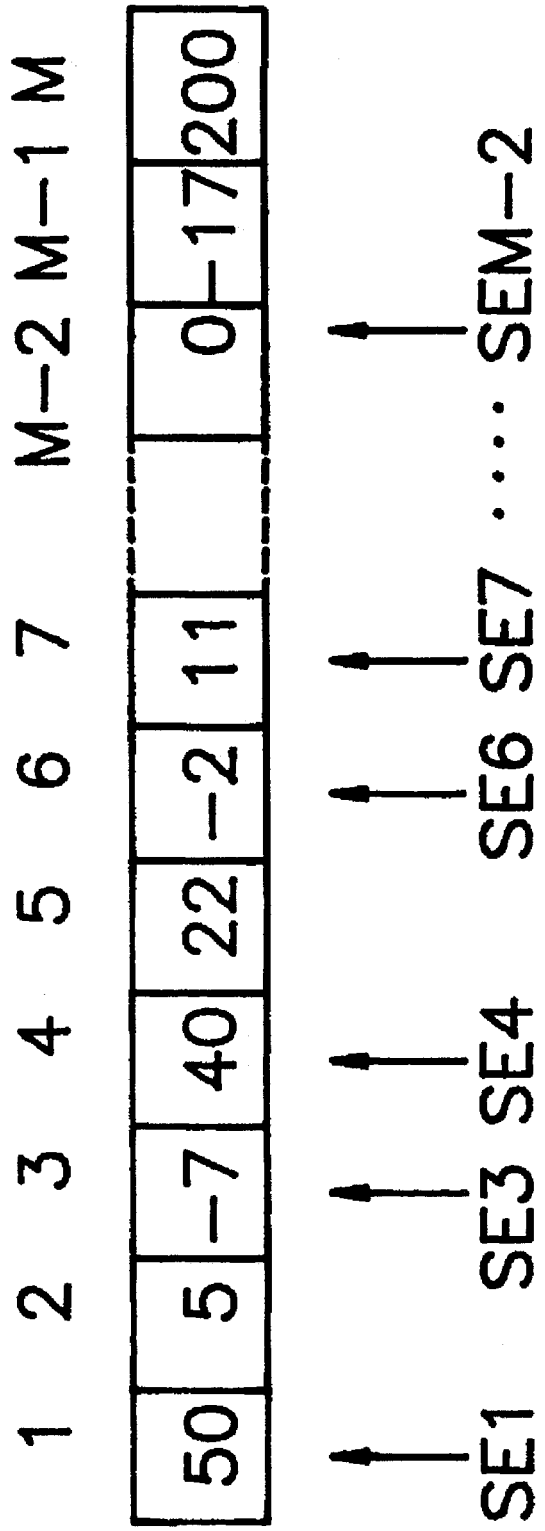
FIG. 2 exemplarily describes the generation of scrambling data through the use of a seed signal with location information.

The H/V blanking pulse detector 20 separates horizontal and vertical blanking pulses from the composite video signal and produces horizontal and vertical blanking detection signals. The horizontal and vertical detection signals are supplied to a scrambling data generator 30 and a parallel-to-serial data converter 18 through line 24. The scrambling data generator 30, which includes a seed signal generator 32 and a random data generator 34, generates scrambling data used to encrypt the video data samples. The seed signal generator 32, in response to each horizontal blanking detection signal, sequentially generates a seed signal. The seed signal from the seed signal generator 32 is provided to the parallel-to-serial data converter 18 through line 26 and the random data generator 34 which sequentially generates a corresponding number of scrambling data therein to the number of the video data samples. The seed signal serves as a "pointer" to point to a start location from which the scrambling data is sequentially derived from the random data generator 34. The pointer has separate position information which corresponds to the start location but randomly appoints the start location although the seed signal is generated from the seed signal generator 32 in a sequential order. The sequential order is initialized and repeated for each vertical blanking detection signal applied to the seed signal generator 32. Also, the scrambling data at each location in the random data generator 34 has a value which is randomly assigned to encrypt the digitized video signal samples. By way of illustration, in FIG. 2, it is assumed that each of the scrambling data in the random data generator 34 has values of 50, 5, −7, 40, 22, 2, 11, . . . , 0, −17, 200 from the left side of the drawing; and that each of the seed signals SEs generated from the seed signal generator 32 has the position information assigned as 1, 3, 2, 6, 4, M-2 and so on. The seed signal SE1 is used as the pointer which appoints the start location 1 of the random data generator 34. In response to the seed signal SE1, the number of scrambling data is sequentially generated from the location "1" in the order of 50, 5, −7, . . . , and 200. Similarly, in case where the seed signal SE with the position information of "M-2" is provided to the random data generator 34, the number of scrambling data is sequentially generated in the order of 0, −17, 200, 50, . . . , 5 and so on.

Each of the scrambling data from the random data generator 34 is sequentially provided to another input of the adder 12 in which each of the video data samples is added thereto. The added value by the adder 12 is provided as a scrambled video sample to a range regulator 14 which controls the scrambled video samples.

However, there may occur a situation that the scrambled video samples may go outside the range of "0" and "255" as a result of mixing the scrambling data with the video data sample. In accordance with the invention, the situation is controlled by the range regulator 14. The detailed operation of the range regulator 14 will be further described with reference to the flow diagram given in FIG. 3.

Figure 3:
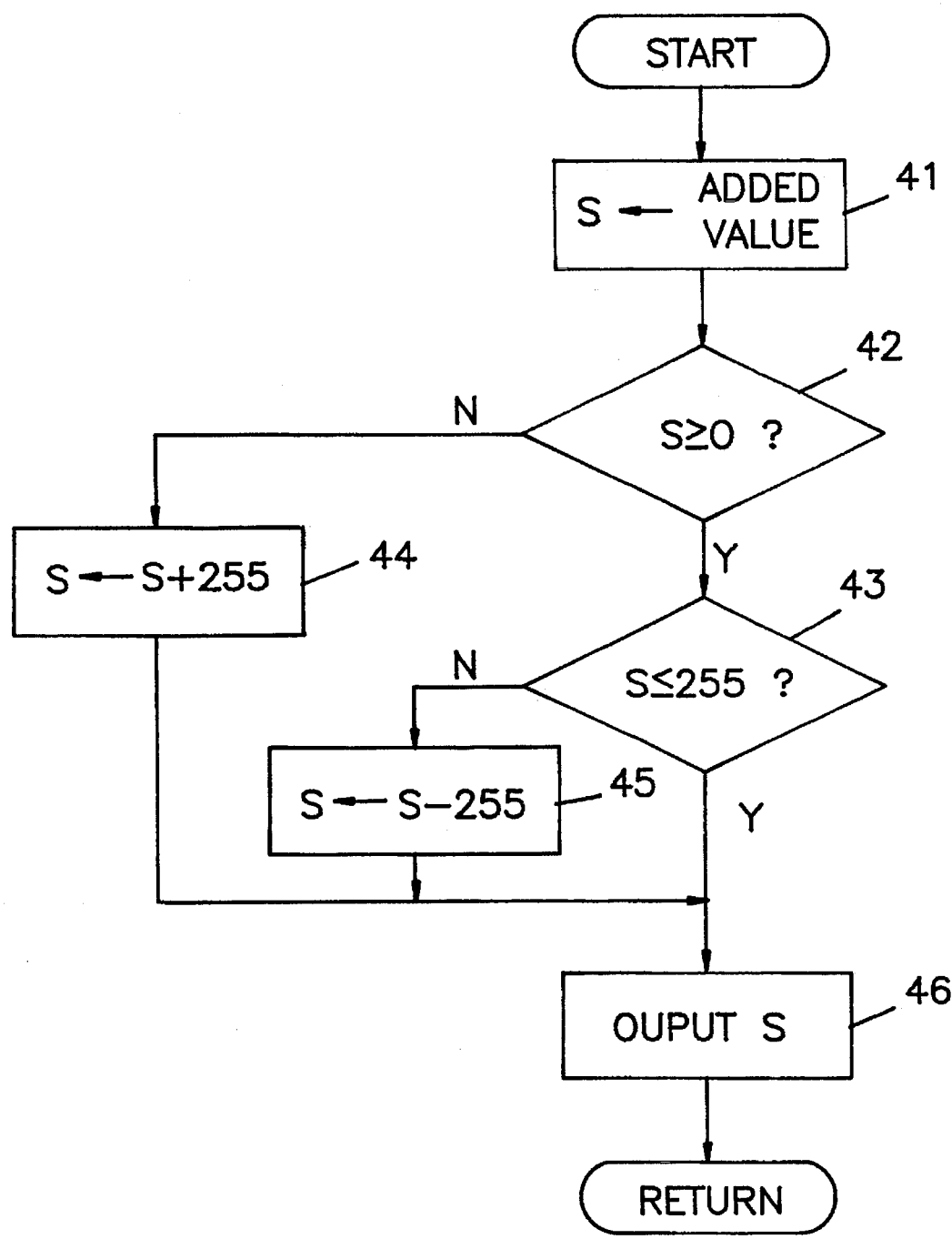
FIG. 3 is a flow diagram explaining the operation of the range regulator shown in FIG. 1.

In FIG. 3, the operation begins at block 41 where the added value of the adder 12 is set to a variable "S". And then, at block 42, it is determined whether or not the variable S is greater than or equal to the value "0". If not, the process flows to block 54 where the value "255" is added to the variable S. However, if the condition is met, the process goes to block 43.

In block 43, it is tested if the variable S is less than or equal to the value "255". If the test result is NO, the process proceeds to block 45 where the value "255" is subtracted from the variable S. However, if the test result is YES, the process goes to block 46. In block 46, the updated value S, i.e., the regulated scrambled video sample, is outputted to the parallel-to-serial data converter 18 through line 16 as shown in FIG. 1 and the process returns to block 41.

The parallel-to-serial data converter 18, which may be of a multiplexer, receives and multiplexes the outputs from the range regulator 14, the seed signal generator 32 and the H/V blanking pulse detector 20. The resultant output of the multiplexer is supplied to a digital-to-analog ("D/A") converter 26 for the transmission of the scrambled video signal in analog form.

Figure 4:
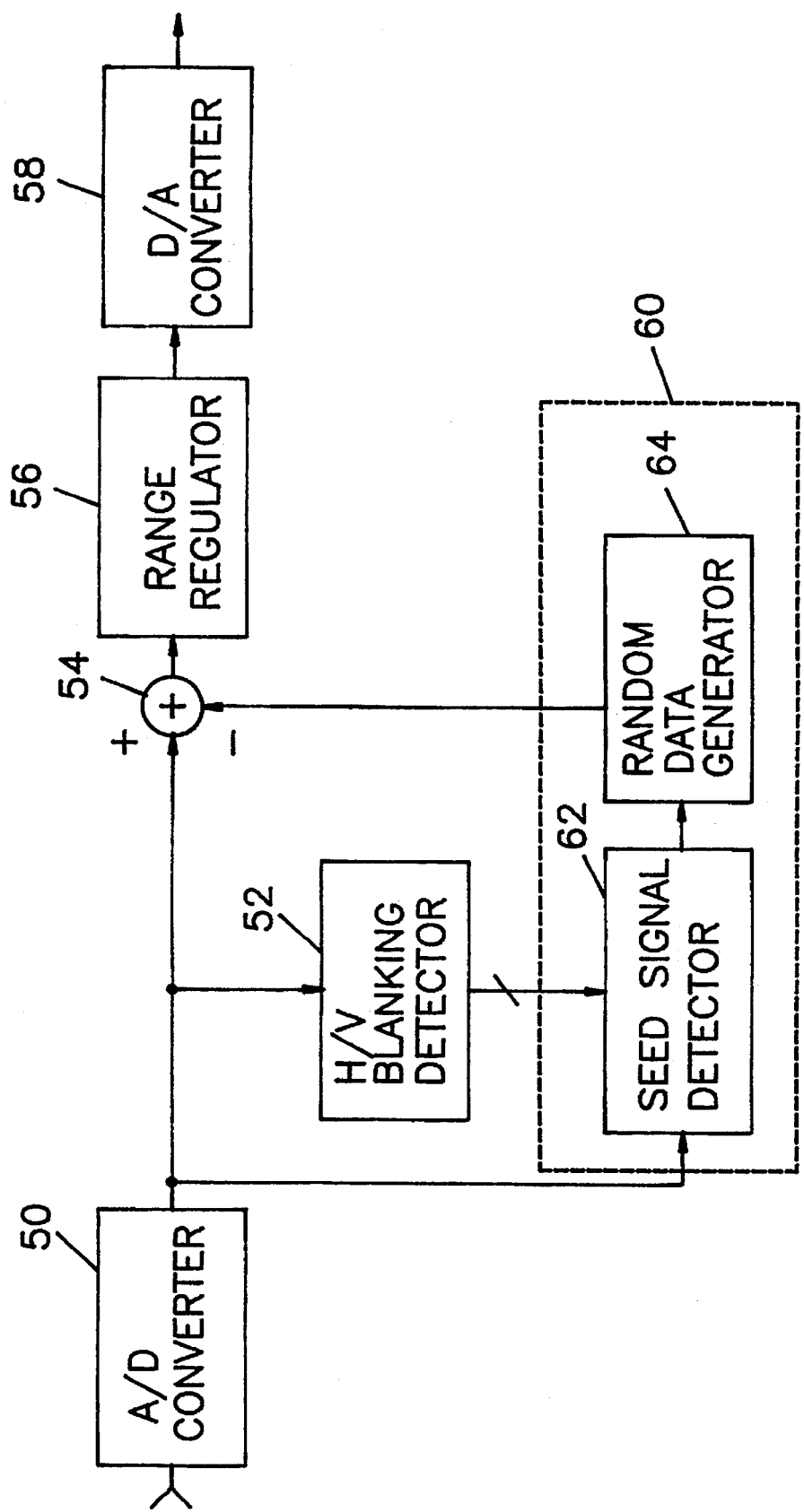
FIG. 4 presents a block diagram of the descrambler in accordance with the present invention.

Referring now to FIG. 4, there is shown a block diagram of a descrambler incorporated in a receiver, which allows the recovery of the scrambled video signal by performing the reverse scrambling.

The scrambled video signal transmitted from the scrambler is applied to an analog-to-digital ("A/D") converter 50 in which the scrambled video signal is sampled and converted into a number of scrambled video data samples. Each of the scrambled video data samples is fed to a horizontal/vertical ("H/V") blanking detector 52, a descrambling data generator 60 and one input end of a subtractor 54.

The H/V blanking detector 52 detects the presence of the horizontal and the vertical blanking detection signals contained in the scrambled video data samples and provides the horizontal and the vertical blanking detection signals to the descrambling data generator 60.

The descrambling data generator 60, which includes a seed signal detector 62 and a random data generator 64, generates a corresponding number of descrambling data to the number of the scrambled video data samples, which has values exactly corresponding to those of the scrambling data. The seed signal detector 62 detects the presence of the seed signals contained in the scrambled video data samples and sequentially provides the detected seed signals to the random data generator 64, in synchronization with the horizontal blanking detection signals from the H/V blanking detector 52, respectively. The sequence of the seed signals is initialized and repeated for each of the vertical blanking detection signals applied to the seed signal detector 62. It should be noted that the seed signal has the separate location information which serves as a "pointer" to point to a start location as in the scrambling data generator 30 as shown in FIG. 1. The random data generator 64, in response to the seed signal, sequentially generates the descrambling data from each location cyclically starting from the start location assigned by the seed signal.

And then, each of the descrambling data from the random data generator 64 is provided to another input end of the subtractor 54 which serves to remove the scrambling data from the scrambled video data samples mixed therewith. The subtractor 54 subtracts the descrambling data from the scrambled video data sample to produce a descrambled video sample. The descrambled video sample is supplied to a range regulator 56. The detailed operation of the range regulator 56 will be described with reference to the flow diagram given in FIG. 5.

Figure 5:
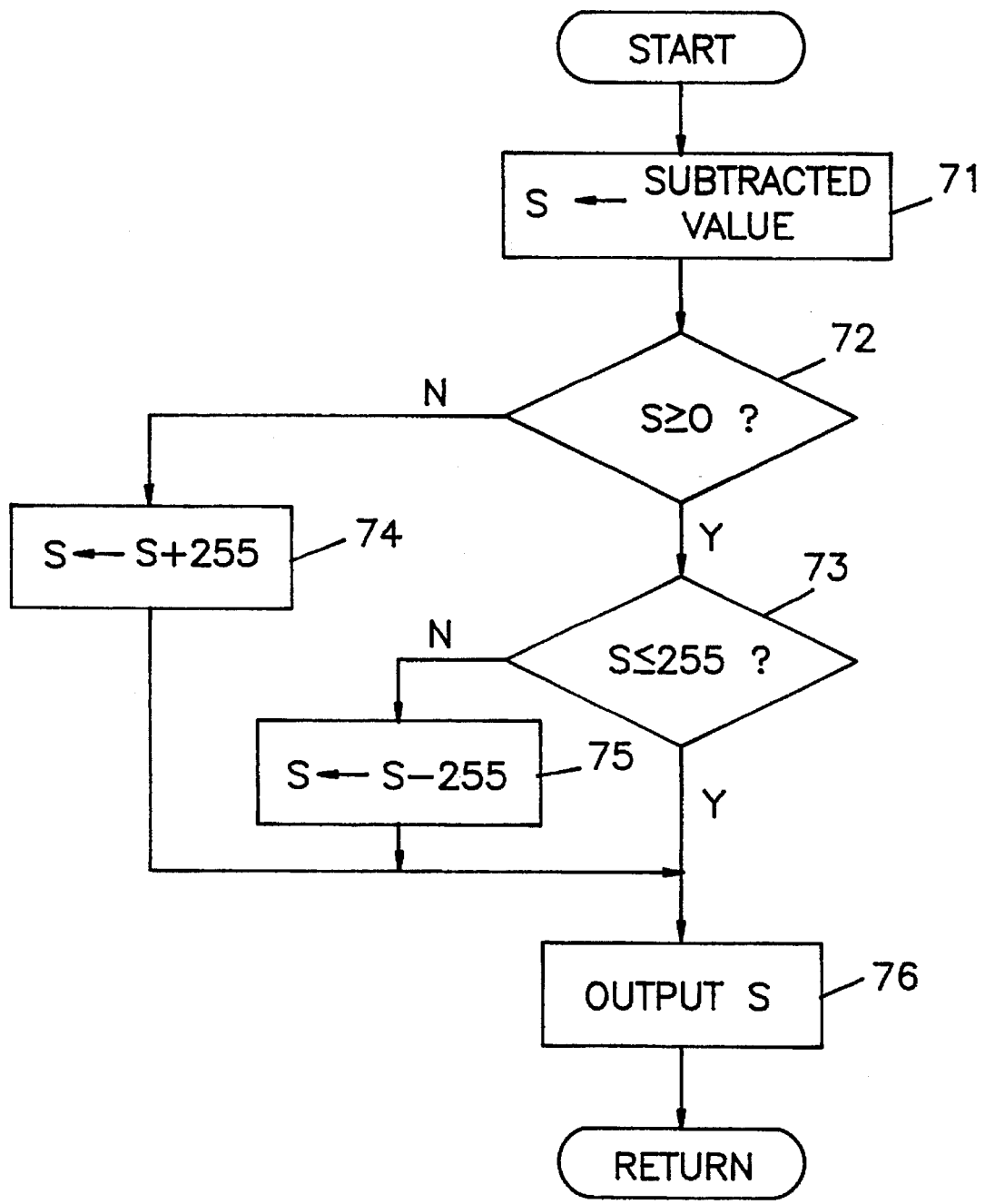
FIG. 5 is a flow diagram representing the operation of the range regulator shown in FIG. 4.

In FIG. 5, the operation begins at block 71 where the subtracted value of the subtractor 54 is set to a variable "S". And then, at block 72, it is determined whether or not the variable S is greater than or equal to the value "0". If not, the process flows to block 74 where the value "255" is added to the variable S. However, if the condition is met, the process goes to block 73.

In block 73, it is tested if the variable S is less than or equal to the value "255". If the test result is NO, the process proceeds to block 75 where the value "255" is subtracted from the variable S. However, if the test result is YES, the process goes to block 76. In block 76, the updated value S, i.e., the controlled descrambled video data sample, is outputted to a digital-to-analog ("D/A") converter 58 as shown in FIG. 4 and the process returns to block 71. The D/A converter 58 performs the conversion of the descrambled video data sample to produce a descrambled video signal in analog form which is reconstructed as is done with the composite video signal inputted to the scrambler shown in FIG. 1.

While the present invention has been shown and described with respect to the preferred embodiments, it will be apparent to those skilled in the art that many changes and modifications may be made without departing from the spirit and scope of the invention as defined in the appended claims.

What is claimed is:

1. A scrambler for scrambling a composite video signal to be transmitted to a receiver, which comprises:

means for detecting a horizontal and a vertical blanking pulse from the composite video signal to produce a horizontal and a vertical blanking detection signal;

means for converting the composite video signal into a number of video data samples, wherein each of the video data samples has one of a group of distinct quantities within a predetermined range;

scrambling data generator, in response to the horizontal and the vertical blanking detection signals, for generating a corresponding number of scrambling data to the number of video data samples, wherein the scrambling data generator includes:

a seed signal generator for generating a seed signal for the horizontal blanking detection signal applied thereto, the seed signal having separate location information and the seed signal generator being initialized by the vertical blanking detection signal applied thereto; and a random data generator, in response to the seed signal, for sequentially generating the scrambling data at locations starting from a start location assigned by the location information;

means for mixing each of the scrambling data into each of the video data samples to produce a scrambled video data sample; and a range regulator for controlling the quantity of the scrambled video data sample from said mixing means to fall within the predetermined range.

2. The scrambler as recited in claim 1, wherein the scrambler further comprises:

means for multiplexing the scrambled video data sample, the seed signal and the horizontal and vertical blanking detection signals; and means for converting the output of the multiplexing means into a scrambled video signal in analog form.

3. An apparatus for scrambling/descrambling a composite video signal, which comprises:

means for detecting a horizontal and a vertical blanking pulses from the composite video signal to produce a horizontal and a vertical blanking detection signal;

a first analog-to-digital converter for converting the composite video signal into a number of video data samples, wherein each of the video data samples has one of a group of distinct quantities within a predetermined range;

a scrambling data generator, in response to the horizontal and the blanking detection signals, for generating a seed signal for use to derive a corresponding number of scrambling data to the number of the video data samples, wherein the scrambling data generator includes:

a seed signal generator for generating the seed signal for the horizontal blanking detection signal, wherein the seed signal has separate location information and the seed signal generator is initialized by the vertical blanking detection signal applied thereto; and a random data generator, in response to the seed signal, for sequentially generating the scrambling data at locations starting from a start location assigned by the location information;

an adder for mixing each of the scrambling data into each of the video data samples to produce a scrambled video data sample;

a first range regulator for controlling the quantity of the scrambled video data sample from the adder to fall within the predetermined range;

means for multiplexing the scrambled video data sample, the seed signal and the horizontal and vertical blanking detection signals;

a first digital-to-analog converter for converting the output of the multiplexing means into a scrambled video signal for the transmission thereof;

a second analog-to-digital converter for converting the transmitted scrambled video signal into a number of scrambled video data samples;

means for detecting the presence of the horizontal and vertical blanking detection signals contained in the scrambled video data samples;

a descrambling data generator, in response to the horizontal and the vertical blanking detection signals applied thereto, for generating a corresponding number of descrambling data to the number of the scrambled video data samples, wherein the descrambling data generator includes:

a seed signal detector for detecting the presence of the seed signal contained in the scrambled video data samples and for providing the seed signal in synchronization with the horizontal blanking detection signal, wherein the seed signal has separated location information and the seed signal generator is initialized by the vertical blanking detection signal applied thereto; and a random data generator, in response to the seed signal, for sequentially generating the descrambling data at locations starting from a start location assigned by the location information;

a subtractor for subtracting each of the descrambling data from each of the scrambled video data samples to produce a descrambled video sample; and a second range regulator for controlling the quantity of the descrambled video data sample from the subtractor to fall within the predetermined range.

* * * * *